United States Patent [19]
Matsunaga et al.

[11] Patent Number: 5,980,815
[45] Date of Patent: Nov. 9, 1999

[54] PROCESS FOR PRODUCING ITO SINTERED BODY

[75] Inventors: Osamu Matsunaga; Yuichi Nagasaki; Tsutomu Takahata, all of Yokohama, Japan

[73] Assignee: Tosoh Corporation, Japan

[21] Appl. No.: 08/989,338

[22] Filed: Dec. 11, 1997

[30] Foreign Application Priority Data

Dec. 20, 1996 [JP] Japan ................................ 8-341845

[51] Int. Cl.$^6$ .......................... C04B 33/32; B02C 19/06
[52] U.S. Cl. ............................. 264/681; 264/614; 241/5
[58] Field of Search .......................... 241/5; 264/614, 264/681

[56] References Cited

U.S. PATENT DOCUMENTS

| | | | |
|---|---|---|---|
| 5,094,787 | 3/1992 | Nakajima et al. | 264/65 |
| 5,401,701 | 3/1995 | Ogawa et al. | 501/134 |
| 5,433,901 | 7/1995 | Rancoule et al. | 264/28 |
| 5,700,419 | 12/1997 | Matsunaga et al. | 264/656 |

OTHER PUBLICATIONS

Modern Ceramic Engineering, Richerson, pp. 394–395, 1992.
Principles of Ceramics Processing, Reed, pp. 314–319, 1995.
Kato et al "New Ceramics Powder Handbook" pp. 182–185 published Jul. 25, 1985 Note—translation of only one paragraph on p. 183 of document (2.2.1).

Primary Examiner—Christopher A. Fiorilla
Attorney, Agent, or Firm—Nixon & Vanderhye

[57] ABSTRACT

An indium oxide-tin oxide (ITO) sintered body is prepared by mixing a tin oxide powder with an indium oxide powder, molding the resulting mixed powder to obtain a green body, and sintering the resulting green body. At least the tin oxide powder has beforehand been pulverized by colliding tin oxide particles with each other or against a collision substance in gas streams. At least 90 wt % of the pulverized tin oxide powder is preferably particles having a particle size of 0.2–10 μm. A jet mill can be used for the pulverization. The ITO sintered body has a density as high as 7.08 g/cm$^3$ or more and, during sputtering, is free from nodule formation and is inhibited from generating particles.

2 Claims, 1 Drawing Sheet

FIGURE
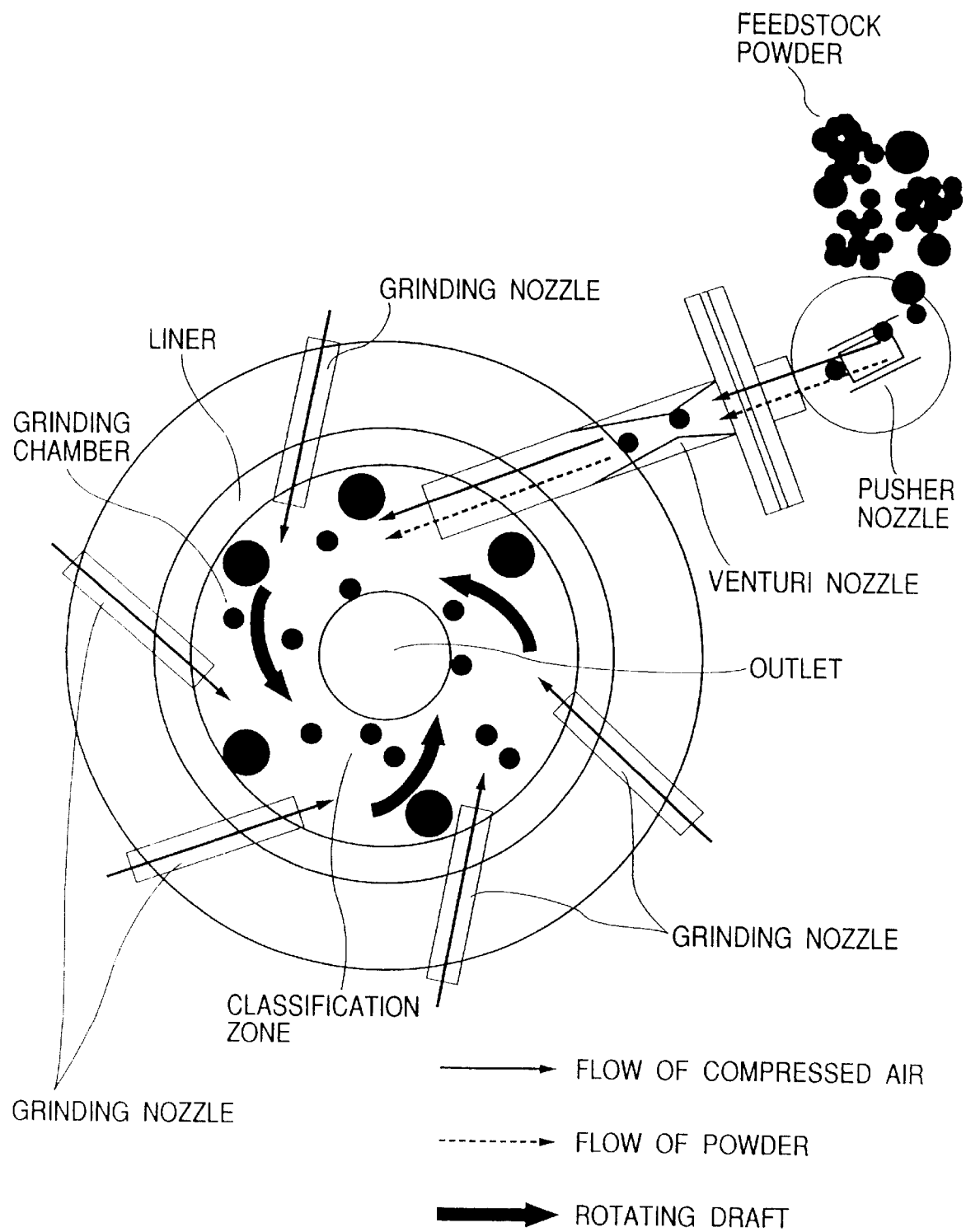

PROCESS FOR PRODUCING ITO SINTERED BODY

FIELD OF THE INVENTION

The present invention relates to a process for producing an ultrahigh density ITO sintered body for use in producing a transparent electrically conductive thin film.

BACKGROUND OF THE INVENTION

ITO (indium-tin oxide) thin films are characterized by high electrical conductivity and high visible-light transmission, and have an advantage that fine processing by lithography is easy. ITO thin films are hence used in a wide range of fields, e.g., display electrodes for flat panel displays, solar cell windows, and antistatic conductive films. In particular, with the recent progress in size increase and finer quality in flat panel displays including liquid crystal displays, there is an increasingly growing demand for ITO thin films for use as display electrodes therein.

The processes for producing ITO thin films are classified into chemical film deposition techniques, e.g., spray pyrolysis process and CVD process, and physical film deposition techniques, e.g., electron beam evaporation process and sputtering process. Among these, sputtering process is used in various fields because high performance films having large areas can be easily obtained by this film deposition technique.

In producing an ITO thin film by sputtering, the target used is either an alloy target comprising indium metal and tin metal (hereinafter abbreviated as "IT target") or a composite oxide target comprising indium oxide and tin oxide (hereinafter abbreviated as "ITO target"). Compared to the sputtering process using an IT target, the process using an ITO target yields films which change less in resistance and transmission with the lapse of time and the control of conditions for film formation can be easier. Because of these advantages, the process using an ITO target has become the mainstream in processes for producing ITO thin films.

Where an ITO target is continuously sputtered in an atmosphere of argon-oxygen gas mixture, a black matter called nodule accumulates on the target surface as the integrated sputtering time increases. This black matter, which is thought to be a suboxide of indium, tends to cause arcing during sputtering because it appears on the periphery of the erosion race track of the target. It is also known that the black matter itself can be a source of particles.

As a result of the continuous sputtering, the thin films formed have defects therein. These defects have been a cause of a reduced yield in the production of flat panel displays, e.g., liquid crystal displays. In particular, in the field of flat panel displays, where there is the progress toward finer quality, the elimination of such defects in the thin films has been a serious problem which should be especially overcome because these defects cause failure of elements.

In prior art processes for producing ITO thin films, a measure to prevent the generation of such defects in thin films has been taken which comprises periodically removing the nodules on the target surface. However, this target cleaning operation has resulted in a considerable decrease in productivity.

It is known that the formation of nodules on ITO targets becomes less with increasing a density of ITO sintered body. However, a sufficiently high sintering density has not been obtained so far, and there has been a strong desire for the development of an ITO target less liable to cause the nodule formation.

SUMMARY OF THE INVENTION

An object of the present invention is to provide a process for more easily and efficiently producing an ultrahigh density ITO sintered body which is used for producing ITO thin films for use, e.g., transparent electrodes in flat panel displays, and the surface of which is prevented from generating nodules, causative of defects in films.

The present inventors made intensive studies in view of the problem described above. As a result, they have found that in a process for producing an ITO sintered body, comprising preparing a mixed powder consisting substantially of indium oxide and tin oxide, molding the mixed powder to obtain a green body, and sintering the green body, density of an ITO sintered body can be easily heightened by colliding tin oxide particles with each other or against a collision substance in gas streams to thereby pulverize the particles and then mixing the resulting tin oxide powder with an indium oxide powder. The present invention has been completed based on this finding.

BRIEF DESCRIPTION OF THE DRAWING

FIG. 1 is a diagrammatic plane view showing one example of a collision type jet milling machine usable in the present invention.

DETAILED DESCRIPTION OF THE INVENTION

In the process of the present invention, a pulverization treatment is first conducted in which tin oxide particles are collided with each other or against a collision substance in gas streams. Examples of apparatuses usable for carrying out the pulverization treatment according to the present invention include jet milling machines such as, e.g., those shown in "Funtai Kiki-Souchi Hando-bukku (Handbook of Machines and Apparatus for Powders)", edited by Editorial Board for Handbook of Machines and Apparatus for Powders (published in 1995, p. 81). Examples of the types of such jet milling machines include air suction type and collision type. However, because tin oxide tends to agglomerate and is hard, it is preferred to use the collision type. FIG. 1 is a diagrammatic (plane) view illustrating an example of the collision type jet milling machines. In this example, feedstock powder is fed from a feed hopper (not shown) disposed above the pusher nozzle (in the direction perpendicular to the paper plane), and are then introduced into a milling chamber through a venturi nozzle by means of stream jetted from the pusher nozzle. In the milling chamber, the feedstock powder is collided with each other or against a collision substance (liner) by means of jet streams from grinding nozzles to thereby pulverize the powder. The pulverized particles pass through a classification zone, and are then discharged through an outlet disposed above the center of the milling chamber (in the direction perpendicular to the paper plane) and recovered. In the collision type jet milling machine, the pulverization of particles is effective since the particles are collided with each other or against the collision substance by means of jet streams. In particular, coarse particles (larger than 10 $\mu$m in terms of secondary particle size) among the feedstock powder are effectively pulverized. Furthermore, since the pulverized particles are immediately discharged from the chamber, they are prevented from being excessively pulverized into ultrafine particles, whereby a fine powder having a narrow particle size distribution can be obtained.

In introducing feedstock powder into the milling machine, it is preferred to feed the powder at a constant rate using, e.g., a constant supplier. The feed rate is not particularly limited because it is determined by the size of the milling machine. It is, however, preferred to regulate the feed rate to a value which is sufficiently small as long as the particles clog neither the milling machine nor the piping and the effect of pulverizing coarse particles is not lessened.

Examples of the medium which forms the jet streams for colliding the particles with each other or against the collision substance include air and inert gases such as argon and nitrogen. Where air is used, it is preferred to dehydrate the air with, e.g., a drier just before introduction into the milling machine. Such a dehydration treatment is preferred in that it is effective in obtaining a pulverized powder which has a reduced water content and in which the agglomeration of the particles is to be weakened.

The medium jetted from the pusher nozzle passes through the venturi nozzle and is then projected into the milling machine together with feedstock powder. Higher jetting pressures are preferred for the pusher nozzle from the standpoint of heightening the pulverization effect. The jetting pressure is preferably 5 kg/cm$^2$ or higher, and more preferably 7 kg/cm$^2$ or higher.

In the milling chamber, a medium such as air is jetted from the grinding nozzles to cause the particles to undergo mutual collision, mutual friction, collision or friction of particles against a collision substance, etc., to thereby pulverize the particles. Higher jetting pressures are preferred for the grinding nozzles from the standpoint of heightening the pulverization effect. The jetting pressure is preferably 5 kg/cm$^2$ or higher, and more preferably 7 kg/cm$^2$ or higher.

The fine particles resulting from the pulverization pass through the classification zone and are then recovered. The amount of the high-speed gas streams jetted from the grinding nozzles in order to form rotating draft within the milling chamber is not particularly limited because it is determined by the size of the milling machine. However, the velocity thereof is preferably at least 1.0 m$^3$/min. Further, the amount of the high-speed gas streams in the milling chamber is not particularly limited, but is preferably 50 m/sec or more, and more preferably 100 m/sec or more, in order to obtain sufficient milling effect.

The liner serving as a collision substance in the milling chamber is preferably made of a ceramic material such as $Al_2O_3$, $ZrO_2$, $Si_3N_4$, or SiC. By use of such a ceramic material, liner abrasion or contamination can be prevented.

The pulverization treatment of tin oxide powder with a jet milling machine is conducted in the manner described above. This treatment is preferably conducted at least twice. This is because when the treatment is conducted only once, there are cases where some proportion of coarse particles contained in the feedstock powder are transported to the outlet of fine particles. By conducting the pulverization treatment two or more times, such coarse particles remaining unpulverized can be pulverized without fail.

Subsequently, a classification treatment with an air classifier is conducted, if desired and necessary, in order to further narrow the particle size distribution of the tin oxide powder obtained by the pulverization described above to thereby remove both coarse particles (larger than 10 $\mu$m in terms of secondary particle size) and ultrafine particles (smaller than 0.2 $\mu$m in terms of secondary particle size). This classification is more preferred in that it is effective in enhancing the densification of the ITO sintered body to be obtained. Methods for the air classification are not particularly limited, and examples thereof include gravitational classification, inertial classification, and centrifugal classification. The cut lines for ultrafine particles and coarse particles can be suitably determined based on a found particle size distribution of the powder obtained after the pulverization treatment.

In order for the tin oxide powder obtained through the treatments described above to give a sintered body having a higher density, the powder is preferably one wherein at least 90 wt % of the powder are tin oxide particles each having a size of from 0.2 to 10 $\mu$m.

On the other hand, the indium oxide powder also is preferably one obtained through the same pulverization treatment, in which feedstock particles are collided with each other or against a collision substance, in order to obtain a sintered body having a higher density. More preferably, the pulverized indium oxide particles are optionally subjected to a classification treatment with an air classifier. The indium oxide powder obtained through such treatments is preferably one wherein at least 90 wt % of the powder are indium oxide particles each having a size of from 0.2 to 10 $\mu$m.

The particle size distribution of a powder was determined as follows. For particle size ranging from 0.2 to 10 $\mu$m, "CAPA-300" (trade name), manufactured by Horiba Seisakusho K.K., Japan was used. The centrifugal sedimentation method (rotational speed: 1,000 rpm) was used for the measurement of particle diameters ranging from 0.2 to less than 2.0 $\mu$m, while the gravitational sedimentation method was used for the measurement of particle diameters ranging from 2 to 10 $\mu$m. The content of particles having a diameter exceeding 10 $\mu$m was determined by dispersing the powder into water with the aid of a dispersant, ultrasonic wave or the like, dropping the resulting dispersion onto a nylon sieve having an opening size of 10 $\mu$m, and dividing the weight of the particles which had not passed through the sieve (remained on the sieve) by the total weight of all particles.

The tin oxide powder and indium oxide powder which have undergone the pulverization treatment are mixed with each other by a wet or dry method using, e.g., a ball mill. It is preferred to obtain a mixed powder having a tin oxide content of from 5 to 15 wt %. This is because the mixed powder having a composition in that range, through molding and sintering, gives a target which through sputtering gives an ITO thin film having the lowest resistivity. The mixing time is preferably at least 5 hours, and more preferably at least 10 hours, from the standpoint of more sufficiently mixing the ingredients.

The mixed powder obtained is molded by a molding technique, e.g., press molding or slip cast molding, to form an ITO green body. Where a green body is produced by press molding, the mixed powder is filled into a mold of a desired size and pressed by a pressing machine at a pressure ranging from 100 to 300 kg/cm$^2$. If the mixed powder has poor moldability, a binder such as a paraffin or poly(vinyl alcohol) may be added if desired and necessary.

Where a green body is produced by the slip cast molding, a binder, a dispersant, and water are added to the ITO mixed powder, and these ingredients are mixed together by means of a ball mill or the like to obtain a slurry to be cast in a mold.

The content of the dispersant in the slurry to be cast in a mold is preferably lower than 2 wt % based on the weight of the mixed powder (total weight of the indium oxide and the tin oxide) from the standpoints of avoiding undesirable agglomeration and obtaining a sufficient dispersing effect. Examples of the dispersant include homo- or copolymers of organic carboxylic acid compounds such as (meth)acrylic acid, (meth)acrylic acid salts, e.g., ammonium (meth)acrylate and alkali metal salts of (meth)acrylic acid, and (meth)acrylic esters, e.g., methyl (meth)acrylate, ethyl (meth)acrylate, butyl (meth)acrylate, and isobutyl (meth) acrylate.

The content of the binder in the slurry to be cast in a mold is preferably lower than 2 wt % based on the weight of the mixed powder (total weight of the indium oxide and the tin oxide) from the standpoint of preventing the cast green body from cracking in the step of dewaxing for the removal of organic ingredients. Examples of the binder include mixtures of hydroxyethyl cellulose with an acrylic acid/acrylamide copolymer, mixtures of poly(ethylene oxide) with poly(vinyl alcohol), acrylic acid/methacrylic acid copolymers, acrylic ester/methacrylic ester copolymers, acrylic acid/acrylamide copolymers, and mixtures of an acrylic acid/methacrylic acid copolymer with poly(ethylene oxide).

The content of water in the slurry to be cast in a mold may be suitably determined while taking account of the smoothness of slip casting operation and the manufacturing yield. The viscosity of the slurry is preferably from 100 to 5,000 cP, and more preferably from 500 to 2,500 cP. Examples of the water include deionized water, distilled water, and ultrapure water.

Before the slurry thus obtained is cast, the slurry is preferably deaerated. The deaerating may be accomplished by adding an anti-foaming agent, e.g., a poly(alkylene glycol), to the slurry and stirring the resulting mixture in vacuum.

A porous mold, a plaster mold, or the like can be used for the slip casting without particular limitations. The molding pressure is preferably in the range of from 3 to 25 $kg/cm^2$ from the standpoint of productivity.

The as-cast green body obtained is then dried. In order to prevent the green body from cracking, this drying is conducted by first allowing as-cast green body to stand at room temperature for at least 24 hours to remove as much water as possible and then drying the green body in an oven. In the oven drying, the green body is preferably heated gradually from a temperature about 40° C. to about 120° C., at which the green body is dried finally. If the shrinkage rate of the pre-dried green body is high, the humidity of the atmosphere may be controlled accordingly.

The green body produced by the pressing method or the green body by the slip casting, which has been dried in an oven, is subjected, if necessary, to compaction by cold isostatic pressing (CIP). The pressure in this CIP is preferably 2 $ton/cm^2$ or higher in order to obtain a sufficient compaction effect.

A dewaxing treatment is then conducted at a temperature of from 300 to 500° C. in order to remove the residual water and organic materials such as a binder remaining in the green body. The rate of heating in the dewaxing treatment is preferably 5° C./hr or lower, and more preferably 3° C./hr or lower, from the standpoint of preventing the green body from cracking during the gasification of the dispersant and binder. Where the green body was produced by the press molding, in particular, without adding organic substances such as a binder, the dewaxing treatment may be omitted.

The green body thus obtained is sintered in a furnace. The sintering is preferably conducted in an oxygen atmosphere, more preferably in a substantially pure oxygen atmosphere, and at an atmospheric pressure. The sintering is preferably conducted while introducing oxygen gas into the furnace at a linear velocity of 2.5 cm/min or higher. The introduction of oxygen gas enables the resulting sintered body to be sufficiently densified. The sintering temperature is preferably in the range from 1,450 to 1,550° C., at which tin oxide is easily solid-soluted into indium oxide. The sintering time is preferably 3 hours or longer in order to obtain a sufficient densification effect.

The sintered body produced by the method described above is an ultrahigh density ITO sintered body having a density of 7.08 $g/cm^3$ or higher. Since the theoretical density of ITO sintered body is 7.156 $g/cm^3$, the sintering density of 7.08 $g/cm^3$ or higher corresponds to a relative density of 98.9% or higher.

The ultrahigh density ITO sintered body thus obtained is machined into a desired shape for a sputtering target. The ultrahigh density ITO sintered body has a higher hardness than conventional ITO sintered bodies and cracks tend to occur inside during machining. It is therefore desirable to conduct wet machining. That sputtering surface may be optionally mirror polished with, e.g., an alumina slurry in order to remove fine scratches remaining on the surface after the wet machining. The thus-treated ITO sintered body is bonded onto a backing plate comprising, for example, oxygen-free copper by using an indium solder or the like to form a sputtering target.

The present invention will be described below in more detail by reference to the following Examples, but the invention should not be construed as being limited to these Examples.

EXAMPLE 1

Tin oxide powder was subjected to a pulverization treatment with a jet milling machine. The pulverizing apparatus employed was "Single-Track Jet Mill FS-4", manufactured by Seishin Kigyo K.K. Conditions for this pulverization treatment are as follows. Dry air was used as a medium. The projecting pressure for pusher nozzles was 7.2 $kg/cm^2$. Dry air was also used for generating rotating drafts within the milling chamber. The projecting pressure for the grinding nozzles was 7.2 $kg/cm^2$, and the amount of dry air projected from the grinding nozzles in the whole apparatus was 1.2 $m^3$/min. The rate of treatment of the powder (feed rate) was 2.0 kg/hr. The liner in the milling chamber was made of $Al_2O_3$. Recovery yield of the fine particles after the pulverization treatment was 95 wt % based on the amount of the powder fed.

The powders were examined for particle size distribution before and after the jet milling. With respect to the unpulverized powder, the proportion of particles having a particle size of larger than 10 $\mu$m was measured with a nylon sieve and was found to be 15.2 wt % based on all particles. The proportion of particles having a particle size of smaller than 0.2 $\mu$m in the unpulverized powder was measured with a particle size distribution analyzer and was found to be 1.8 wt % based on all particles. In contrast, in the powder recovered after the jet milling, the proportion of particles having a particle size of larger than 10 $\mu$m and that of particles having a particle size of smaller than 0.2 $\mu$m were 2.8 wt % and 4.0 wt %, respectively, based on all particles, and 93.2 wt % of all the recovered powder were particles having a particle size of from 0.2 to 10 $\mu$m.

200 g of the tin oxide powder obtained through jet milling was mixed with 1,800 g of an indium oxide powder which had not undergone jet milling, for 48 hours by means of a dry ball mill. The resulting mixed powder was taken out of the vessel. Thereto were added 55.0 g of a poly(carboxylic acid) dispersant (trade name "A-40", manufactured by Kyowa Sangyo Co., Ltd., Japan; solid content, 40%), 40.0 g of a poly(acrylic acid) binder (trade name "WE-518", manufactured by Chukyo Yushi Co., Ltd., Japan; solid content, 50%), and 490 g of deionized water. This mixture was treated with a ball mill for 16 hours. Viscosity of the resulting slurry to be cast in a mold was measured, and was found to be 1,360 cP.

To the slurry was added 3.8 cm$^3$ of a poly(alkylene glycol) anit-foaming agent (trade name "CA-220", manufactured by Nippon Oil & Fats Co., Ltd., Japan). This slurry was deaerated in vacuum. The deaerated slurry was poured into a casting mold having dimensions of 150 mm by 250 mm by 12 mm, and slip casting was conducted at a pressure of 5 kg/cm$^2$. The resulting cast green body was dried and then compacted by a CIP treatment at a pressure of 3 ton/cm$^2$ to obtain a green body having a density of 3.94 g/cm$^3$. The green body was then placed in an atmospheric furnace and dewaxed under the following conditions to remove the dispersant and binder.

(Dewaxing Conditions)

Dewaxing temperature: 450° C.

Heating rate: 5° C./hr

Keep time: None

Density of the dewaxed green body: 3.93 g/cm$^3$

The dewaxed green body was sintered in a pure oxygen atmosphere under the following conditions.

(Sintering Conditions)

Sintering temperature: 1,500° C.

Heating rate: 25° C./hr

Sintering time: 5 hours

Linear velocity of oxygen introduction: 8.0 cm/min

The density of the sintered body was measured by the Archimedes method and was found to be 7.08 g/cm$^3$. This sintered body was wet-machined to dimensions of 102 mm by 178 mm by 6 mm, and then bonded with an indium solder to a backing plate made of oxygen-free copper to thereby obtain a sputtering target. This target was used for sputtering under the following conditions to conduct a continuous discharge test.

(Sputtering Conditions)

DC power: 472 W (2.6 W/cm$^2$)

Gas pressure: 0.5 Pa

Argon gas flow rate: 50 SCCM oxygen gas flow rate: 0.6 SCCM

After 60 hours from the start of the test, occurrence of nodule was observed in the vicinity of erosion race track. However, the area occupied by the nodules was as small as up to 0.1% of the target surface area. That area of the target surface which was occupied by nodules was determined by taking an optical photograph of the whole target surface, analyzing this photograph with an image scanner, and subjecting the data obtained to image analysis by a computer (discrimination between nodule parts and noduleless parts).

EXAMPLE 2

A tin oxide powder which had undergone jet milling in the same manner as in Example 1 was subjected again to the jet milling treatment under the same conditions as in Example 1. Recovery yield of the fine particles after the pulverization treatments was 93 wt % based on the weight of the powder fed. The powder thus obtained through jet milling (two passes) was examined for particle size distribution. As a result, the proportion of particles having a particle size of larger than 10 μm and that of particles having a particle size of smaller than 0.2 μm were found to be 1.6 wt % and 4.3 wt %, respectively, based on all particles, and 94.1 wt % of all the powder obtained were particles having a particle size of from 0.2 to 10 μm.

The tin oxide powder thus obtained through jet milling was mixed by means of a dry ball mill with an indium oxide powder which had not undergone jet milling, in the same manner as in Example 1. To the resulting mixed powder were added a dispersant, a binder, and deionized water to prepare a slurry to be cast in a mold. Viscosity of the slurry thus prepared was measured, and was found to be 1,300 cP. This slurry was deaerated and then cast molded in the same manner as in Example 1. The resulting cast green body was dried and then compacted by a CIP treatment at a pressure of 3 ton/cm$^2$ in the same manner as in Example 1 to obtain a green body having a density of 3.96 g/cm$^3$.

The green body was placed in an atmospheric furnace and dewaxed under the following conditions to remove the dispersant and binder.

(Dewaxing Conditions)

Dewaxing temperature: 450° C.

Heating rate: 3° C./hr

Keep time: None

Density of the dewaxed green body: 3.95 g/cm$^3$

The dewaxed green body was sintered in a pure oxygen atmosphere under the following conditions.

(Sintering Conditions)

Sintering temperature: 1,500° C.

Heating rate: 50° C./hr

Sintering time: 8 hours

Linear velocity of oxygen introduction: 6.0 cm/min

The density of the sintered body was measured by the Archimedes method and was found to be 7.11 g/cm$^3$. A target was produced from this sintered body in the same manner as in Example 1, and a continuous discharge test was conducted. As a result, no nodule occurrence was observed over the entire life of the target.

EXAMPLE 3

A tin oxide powder obtained through jet milling (two passes) in the same manner as in Example 2 was subjected to air classification. The classifier used was "Turbo Classifier TC-15", manufactured by Nisshin Engineering Co., Ltd., Japan. The classification was conducted under the conditions of a classifying rotor rotational speed of 12,000 rpm, an amount of air used of 2.8 m$^3$/min, a powder-dispersing pressure of 4.0 kg/cm$^2$, and a classification (powder feed) rate of 1.0 kg/hr. The classifying rotor used was made of Al$_2$O$_3$. Recovery yield of the fine particles after the classification was 35 wt % based on the amount of the powder fed. The recovery yield of ultrafine particles caught by a bag filter was 1 wt %, while that of coarse particles was 64 wt %. The powder recovered as fine particles in the classification was examined for particle size distribution. As a result, the proportion of particles having a particle size of larger than 10 μm and that of particles having a particle size of smaller than 0.2 μm were found to be 0.5 wt % and 1.1 wt %, respectively, based on all particles, and 98.4 wt % of all the powder obtained were particles having a particle size of from 0.2 to 10 μm.

The tin oxide powder recovered as fine particles in the air classification described above was mixed with an indium oxide powder by means of a dry ball mill in the same manner as in Example 1. To the resulting mixed powder were added a dispersant, a binder, and deionized water to prepare a slurry to be cast in a mold. Viscosity of the slurry thus prepared was measured, and was found to be 1,280 cP. This slurry was deaerated and then cast molded in the same manner as in Example 1. The resulting cast green body was dried and then compacted by a CIP treatment at a pressure of 3 ton/cm² in the same manner as in Example 1 to obtain a green body having a density of 3.98 g/cm³.

The green body was placed in an atmospheric furnace and dewaxed under the following conditions to remove the dispersant and binder.
(Dewaxing Conditions)

Dewaxing temperature: 450° C.

Heating rate: 3° C./hr

Keep time: None

Density of the dewaxed green body: 3.97 g/cm³

The dewaxed green body was sintered in a pure oxygen atmosphere under the following conditions.
(Sintering Conditions)

Sintering temperature: 1,500° C.

Heating rate: 25° C./hr

Sintering time: 5 hours

Linear velocity of oxygen introduction: 10.0 cm/min

The density of the sintered body obtained was measured by the Archimedes method and was found to be 7.15 g/cm³. A target was produced from this sintered body in the same manner as in Example 1, and a continuous discharge test was conducted. As a result, no nodule occurrence was observed over the entire life of the target.

EXAMPLE 4

Indium oxide powder was subjected to jet milling. The pulverizing apparatus employed was "Single-Track Jet Mill FS-4", manufactured by Seishin Kigyo K.K. Conditions for this pulverization treatment are as follows. Dry air was used as a medium. The projecting pressure for the pusher nozzle was 7.2 kg/cm². Dry air was also used for generating rotating draft within the milling chamber. The projecting pressure for the grinding nozzles was 7.2 kg/cm², and the amount of dry air projected from the grinding nozzles in the whole apparatus was 1.2 m³/min. The rate of treatment of the powder (feed rate) was 2.0 kg/hr. The liner in the milling chamber was made of $Al_2O_3$. Recovery yield of the fine particles after the pulverization treatment was 97 wt % based on the amount of the powder fed.

The indium oxide powders were examined for particle size distribution before and after the jet milling. With respect to the unpulverized powder, the proportion of particles having a particle size of larger than 10 μm was measured with a nylon sieve and was found to be 8.3 wt % based on all particles. The proportion of particles having a particle size of smaller than 0.2 μm in the unpulverized powder was measured with a particle size distribution analyzer and was found to be 2.2 wt % based on all particles. In contrast, in the powder recovered after the jet milling, the proportion of particles having a particle size of larger than 10 μm and that of particles having a particle size of smaller than 0.2 μm were 1.9 wt % and 3.8 wt %, respectively, based on the weight of all particles, and 94.3% of all the recovered powder were particles having a particle size of from 0.2 to 10 μm.

The indium oxide powder thus obtained through jet milling was dry-mixed with a tin oxide powder obtained in the same manner as in Example 3 through jet milling (two passes) and air classification. This mixing was conducted using a ball mill in the same manner as in Example 1. To the resulting mixed powder were added a dispersant, a binder, and deionized water to prepare a slurry to be cast in a mold. Viscosity of the slurry was measured, and was found to be 1,150 cP. This slurry was deaerated and then cast molded in the same manner as in Example 1. The resulting cast green body was dried and then compacted by a CIP treatment at a pressure of 3 ton/cm² in the same manner as in Example 1 to obtain a green body having a density of 4.00 g/cm³.

The green body was placed in an atmospheric furnace and dewaxed under the following conditions to remove the dispersant and binder.
(Dewaxing Conditions)

Dewaxing temperature: 450° C.

Heating rate: 2° C./hr

Keep time: None

Density of the dewaxed green body: 3.99 g/cm³

The dewaxed green body was sintered in a pure oxygen atmosphere under the following conditions.
(Sintering Conditions)

Sintering temperature: 1,500° C.

Heating rate: 25° C./hr

Sintering time: 15 hours

Linear velocity of oxygen introduction: 8.0 cm/min

The density of the sintered body was measured by the Archimedes method and was found to be 7.16 g/cm³. A target was produced from this sintered body in the same manner as in Example 1, and a continuous discharge test was conducted. As a result, no nodule occurrence was observed over the entire life of the target.

COMPARATIVE EXAMPLE 1

In a 3 liter polyethylene pot were placed 300 g of the raw tin oxide powder used in Example 1. Thereto were added 2.5 kg of nylon balls of 15 mm in diameter having an iron core. Ball mill grinding was conducted for 48 hours. The powder thus obtained through ball mill grinding was examined for particle size distribution. As a result, the proportion of particles having a particle size of larger than 10 μm and that of particles having a particle size of smaller than 0.2 μm were found to be 5.4 wt % and 6.4 wt %, respectively, based on the weight of all particles. The tin oxide powder thus obtained through ball mill grinding was dry-mixed with the indium oxide used in Example 1 which had not undergone jet milling. This mixing was conducted using a ball mill in the same manner as in Example 1. The resulting mixed powder was used to prepare a slurry to be cast in a mold. Viscosity of the slurry thus prepared was measured, and was found to be 1,420 cP.

The slurry was deaerated and then cast molded in the same manner as in Example 1. The resulting cast green body was dried and then compacted by a CIP treatment at a pressure of 3 ton/cm² in the same manner as in Example 1 to obtain a green body having a density of 3.82 g/cm³. This green body was dewaxed under the same conditions as in Example 1. As a result, the dewaxed green body had a density of 3.80 g/cm³. This dewaxed green body was sintered under the same sintering conditions as in Example 1 to produce an ITO sintered body. The density of the sintered body was measured by the Archimedes method and was found to be 6.95 g/cm³. A target was produced from this sintered body in the same manner as in Example 1, and a continuous discharge test was conducted. As a result, after 35 hours from the initiation of the test, nodule occurrence was observed gradually in the vicinity of erosion race track. After 60 hours from the initiation thereof, the amount of nodule reached 26.7% of the entire surface of the target.

According to the process of the present invention, an ITO sintered body used as sputtering target for producing a transparent conductive film can be produced easily and efficiently. Furthermore, since the ITO sintered body obtained has a density as high as 7.08 g/cm³ or more, the ITO sputtering target neither suffers nodule occurrence nor generates particles during sputtering. Therefore, the target is effective in greatly improving yield in LCD production.

While the invention has been described in detail and with reference to specific embodiments thereof, it will be apparent to one skilled in the art that various changes and modifications can be made therein without departing from the spirit and scope thereof.

What is claimed is:

1. A process for producing an ITO sintered body having a density of 7.08 g/cm$^3$ or higher comprises:

preparing a mixed powder consisting substantially of indium oxide and tin oxide;

molding the mixed powder to obtain a green body; and furnace sintering the green body at atmospheric pressure while optionally introducing oxygen into the furnace;

said mixed powder obtained by colliding tin oxide particles with each other or against a collision substance in gas streams to thereby pulverize the particles and then mixing the resulting tin oxide powder with an indium oxide powder wherein at least 90 wt % of the tin oxide powder is tin oxide particles having a particle size of from 0.2 to 10 $\mu$m.

2. The process for producing an ITO sintered body as claimed in claim 1, wherein the indium oxide powder to be mixed with the pulverized tin oxide powder is obtained by colliding indium oxide particles with each other or against a collision substance in gas streams to thereby pulverize the particles wherein at least 90 wt % of the indium oxide powder is indium oxide particles having a particle size of from 0.2 to 10 $\mu$m.

* * * * *